US007617219B2

(12) United States Patent
Betancourt et al.

(10) Patent No.: US 7,617,219 B2
(45) Date of Patent: Nov. 10, 2009

(54) ENHANCED HANDLING OF REPEATED INFORMATION IN A WEB FORM

(75) Inventors: Melissa Betancourt, Miami, FL (US); Randy S. Haven, Raleigh, NC (US); Robert E. Loredo, North Miami Beach, FL (US); Rodrigo J. Pastrana, Delray Beach, FL (US); Michael L. Taylor, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 11/425,946

(22) Filed: Jun. 22, 2006

(65) Prior Publication Data

US 2008/0010586 A1  Jan. 10, 2008

(51) Int. Cl.
*G06F 17/30* (2006.01)
(52) U.S. Cl. .................. 707/10; 707/100; 715/222; 715/224
(58) Field of Classification Search ............. 707/10, 707/104, 102, 100; 715/221, 222, 764, 234, 715/224
See application file for complete search history.

(56) References Cited

U.S. PATENT DOCUMENTS

| 6,934,913 | B2 | 8/2005 | Le et al. |
| 2002/0086661 | A1 | 7/2002 | Rouse et al. |
| 2004/0019616 | A1 | 1/2004 | Moffatt |
| 2004/0031058 | A1* | 2/2004 | Reisman ............ 725/112 |
| 2004/0032432 | A1* | 2/2004 | Baynger ............ 345/810 |
| 2005/0065856 | A1* | 3/2005 | Roberts et al. ........ 705/26 |
| 2005/0086581 | A1* | 4/2005 | Bass et al. .......... 715/500.1 |
| 2005/0216421 | A1* | 9/2005 | Barry et al. ........... 705/64 |
| 2005/0262166 | A1 | 11/2005 | Rajeev et al. |
| 2006/0161564 | A1* | 7/2006 | Pierre et al. ......... 707/100 |
| 2008/0046803 | A1* | 2/2008 | Beauchamp et al. ..... 715/212 |

OTHER PUBLICATIONS

Watters, C., et al., "Using Large Tables on Small Display Devices", Int'l. J. of Human-Computer Studies, vol. 48, No. 1, pp. 21-37, Jan. 2003.

* cited by examiner

*Primary Examiner*—Etienne P LeRoux
*Assistant Examiner*—Thuy (Tiffany) Bui
(74) *Attorney, Agent, or Firm*—Patents On Demand, PA; Brian K. Buchheit

(57) ABSTRACT

A presentation interface for rendering Web form content can include a Web form, a repeated item section, and a collection control section. The Web form can be written in a markup language based upon a Standard Generalized Mark-up Language (SGML). The Web form can include a repeating structure that references a collection of data items. The repeated item section can present the data items in a tabular format. The repeated item section can also include multiple selectors, one selector corresponding to each data item. The collection control section can include at least one user selectable collection actuator, such as a button, that performs a function associated with the actuator upon only those designated data items in the collection for which a corresponding selector has been chosen.

15 Claims, 4 Drawing Sheets

```
<html    xmlns="http://www.w3.org/1999/xhtml"                                              110
         xmlns:xforms="http://www.w3.org/2002/xforms"
         xmlns:xsd="http://www.w3.org/2001/XMLSchema"
         xmlns:ev="http://www.w3.org/2001/xml-events"
         xmlns:s="http://www.ibm.com/2003/sample">

<head>
                  <xforms:model>
                           <xforms:instance id="submit" src="employee.xml"/>
                  </xforms:model>
         </head>
         <body>
                  <xforms:repeat id="result" nodeset="/Employee">
                           <xforms:output ref="ID">
                                    <xforms:label>ID:</xforms:label>
                           </xforms:output>
                           <xforms:output ref="FirstName">
                                    <xforms:label>First Name:</xforms:label>
                           </xforms:output>
                           <xforms:output ref="LastName">
                                    <xforms:label>Last Name:</xforms:label>
                           </xforms:output>
                           <xforms:trigger>
                                    <xforms:label>Submit</xforms:label>
                                    <xforms:action    ev:event="DOMActivate">
                                             <xforms:toggle case= "response" />
                                    </xforms:action>
                           </xforms:trigger>
                           <br/>
                  </xforms:repeat>
                  ...
         </body>
</html>
```

XFORMS Interface 150

| ID: | First Name | Last Name | |
|---|---|---|---|
| 1001001 | John | Doe | Submit |
| 2002002 | Jane | Doe | Submit |
| 3003003 | James | Doe | Submit |

```
<Employee>                                          Employee.xml 310
        <ID>1001001</ID>
        <FirstName>John</FirstName>
        <LastName>Doe</LastName>
</Employee>
<Employee>
        <ID>2002002</ID>
        <FirstName>Jane</FirstName>
        <LastName>Doe</LastName>
</Employee>
<Employee>
        <ID>3003003</ID>
        <FirstName>James</FirstName>
        <LastName>Doe</LastName>
</Employee>
```

```
                                              EmployeeForm.xhtml 320
<html   xmlns="http://www.w3.org/1999/xhtml"
        xmlns:xforms="http://www.w3.org/2002/xforms"
        xmlns:xsd="http://www.w3.org/2001/XMLSchema"
        xmlns:ev="http://www.w3.org/2001/xml-events"
        xmlns:s="http://www.ibm.com/2003/sample">

<head>
                <xforms:model>
                        <xforms:instance id="submit" src="employee.xml"/>
                </xforms:model>
        </head>
        <body>
                <xforms:repeat id="result" nodeset="/Employee">
                        <xforms:output ref="ID">
                                <xforms:label>ID:</xforms:label>
        322             </xforms:output>
                        <xforms:output ref="FirstName">
                                <xforms:label>First Name:</xforms:label>
                        </xforms:output>
                        <xforms:output ref="LastName">
                                <xforms:label>Last Name:</xforms:label>
                        </xforms:output>
                </xforms:repeat>
        </body>
</html>
```

```
<html   xmlns="http://www.w3.org/1999/xhtml"  EmployeeForm2.xhtml 330
        xmlns:xforms="http://www.w3.org/2002/xforms"
        xmlns:xsd="http://www.w3.org/2001/XMLSchema"
        xmlns:ev="http://www.w3.org/2001/xml-events"
        xmlns:s="http://www.ibm.com/2003/sample">

<head>
                <xforms:model>
                        <xforms:instance id="submit" src="employee.xml"/>
                </xforms:model>
        </head>
        <body>
                <RepeatTable Type = "Radio"  Btn = "Submit">
                <xforms:repeat id="result" nodeset="/Employee">
        332             <xforms:output ref="ID">
                                <xforms:label>ID:</xforms:label>
                        </xforms:output>
                        <xforms:output ref="FirstName">
                                <xforms:label>First Name:</xforms:label>
                        </xforms:output>
                        <xforms:output ref="LastName">
                                <xforms:label>Last Name:</xforms:label>
                        </xforms:output>
                </xforms:repeat>
                </RepeatTable>
        </body>
</html>
```

FIG. 3

ENHANCED HANDLING OF REPEATED INFORMATION IN A WEB FORM

BACKGROUND

1. Field of the Invention

The present invention relates to the field of mobile devices and Web Form interfaces and, more particularly, to an enhancement for handling repeated data items in a Web form interface.

2. Description of the Related Art

XForms is a markup language specified by the World Wide Web Consortium (W3C) that is based upon an Extensible Markup Language (XML). XForms uses a Model-View-Controller approach to separate data logic of a form from its presentation. Data logic is handled by an XForms model and presentation is handled by an XForms user interface. An XForms model holds instance data and associated constraints. Instance data is an internal representation of data of the XForms model. An XForms model can hold more than one data instance. In other words, the XForms model defines what a form is, what data a form should contain, and how the data of a form should be handle.

In XForms, presentation is handled by an XForms user interface or other compatible user interface, such as a XML user interface configured to interoperate with an XForms model. That is, an XForms user interface handles the display and input of data. It should be noted that the term "XForms user interface" shall be used generically throughout this application to represent any XForms compliant user interface.

The XForms specification allows for the definition of repeating structures such as repeating rows of related information pulled from a database. An XForms "repeat" structure can include the elements for repeat, item set, copy, insert, delete, set index, and the like. The repeat element defines a user interface mapping over a homogeneous collection selected by node set binding attributes. The node-set must consist of a set of contiguous child element nodes, with the same local name and namespace name of a common parent node.

Having provided a basic overview of conventional XForms terminology, a common use of XForms based technologies shall now be provided to illustrate a potential problem existing with conventionally implemented XForms solutions. It should be noted that this problem and its presented solution are not limited to XForms based technologies, but apply generally to conventionally implemented Web forms. The XForms based examples are provided for descriptive purposes only and one of ordinary skill can easily adapt the examples to other Web form technologies.

Web forms are often used to display repeated information, such as data items of a homogeneous collection obtained from a database source. For example, a shopping cart Web form can include a number of items to be checked out or purchased. Users often want to interact with the repeated information presented in the Web form. A user may wish to update a quantity of an item in the shopping cart, to remove one or more item from the cart, to add new items to the cart and the like. After the user manipulates the list representing shopping art items, this list is sent to a back-end system, such as a database system, for further processing.

Current solutions for repeated data conforming to the XForms specification require a table of repeated information be created with separate triggers for each row or item. Each trigger can be selected to perform a desired action. This solution, however, requires multiple user actions to select multiple records. The solution also consumes display space, which can be problematic for small displays, such as those on mobile devices.

To illustrate, FIG. 1 shows a prior art XForms compliant solution for an employee table. In FIG. 1, axle 110 can be used to generate interface 150. As noted in the code 110, each repeated line includes an XForms trigger For even a simple repeated set, processing a moderate amount of XML code for the triggers is necessary, which can consume resources such as memory and bandwidth.

In interface 150, the triggers from code 110 are associated with submit buttons 155. It can be readily appreciated that adding additional buttons per row, such as a delete button (not shown), will quickly consume display space, which can be highly detrimental since tabular display space is often at a premium. Space constraints are often overcome by using a scrolling display screen, which can be difficult to read. Space is even more constrained when small displays are used, such as displays of a mobile computing device. Using interface 150 or a similar one, submitting, deleting, or otherwise manipulating multiple rows of repeated information can be cumbersome, especially when excessive screen scrolling is required. Further, when multiple rows need to be manipulated, multiple user actions are required. Additionally, the selectors appearing in conventional XForms compliant interfaces for repeated data are hard coded into a user interface, making it difficult for a user or developer to customize an appearance and/or a behavior of the interface.

SUMMARY OF THE INVENTION

A solution for presenting repeated data in a tabular form upon a space restricted display in a selectable fashion. The solution can be utilized for Web form enabled interfaces of mobile devices, such as XForms complaint interfaces. The repeated data can be a collection of homogeneous data items obtained from a repeating structure of the Web Form, such as the XForms "repeat" structure. In the interface, a selector can be presented next to each presented data item. The selectors need not be defined within the repeating structure, but can instead be defined within a collection level parameter that applies to each data item of the collection. A user can select one or more data items using the corresponding selectors. For example, a user can select multiple data items and submit these items to a backend server for processing. Other operations can be performed on selected data items, such as adding data items, editing data items, and deleting data items.

Different types of selectors used in the present solution can include a mutually exclusive selector (a radio button), a non-exclusive selector (a binary selector or check box), and a hidden selector that causes a table of data items to be presented without showing selectors. In one embodiment, a designer configuration interface and/or a user configurable interface can be used to specify collection level parameters. In another embodiment, a special tag of a mark-up language can be used to specify the collection level parameters.

The present invention can be implemented in accordance with numerous aspects consistent with material presented herein. For example, one aspect of the present invention can include a presentation interface for rendering Web form content. The interface can include a Web form, a repeated item section, and a collection control section. The Web form can be written in a markup language based upon a Standard Generalized Mark-up Language (SGML). The Web form can include a repeating structure that references a collection of data items. The repeated item section can present the data items in a tabular format. The repeated item section can also include multiple selectors, one selector corresponding to each data item. The collection control section include at least one user selectable collection actuator, such as a button, that performs a fiction associated with the actuator upon only those designated data items in the collection for which a corresponding selector has been chosen.

Another aspect of the present invention can include a method for presenting repeated data items within a Web form. The method can include a step of identifying a Web form written in a markup language based upon a SGML. The Web form can include a repeating structure that references a collection of data items. A collection level parameter can be accessed to determine a type of selector associated with the data items. Repetitive code loops can be performed against the repeating structure to obtain information for each referenced data item. The Web form can be presented in a graphical interface. The referenced data items can be presented in a tabular format, where each data item is presented with a corresponding selector of a type designed by the collection level parameter. At least one collection level button or actuator can also be displayed. When selected, the displayed button can perform a function involving data items selected via corresponding ones of the selectors.

Yet another aspect of the present invention can include a mobile device having an embedded display screen and an input mechanism for selecting elements presented upon the screen. An interface can also be included for rendering Web forms upon the screen, where the input mechanism can be used to interact with the rendered Web forms. A Web form rendered in the interface can be written in an SGML based language. The Web form can include a repeating structure that references a collection of data items. One section of the interface can present the data items in a tabular format along with corresponding selectors. Different types of selectors can be available including a mutually exclusive selector and a non-exclusive selector. A type of selector presented in the interface can be determined by a collection level parameter. The interface can include one or more buttons that perform functions upon data items designed via the selectors.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

FIG. 1 shows a prior art XForms compliant solution for an employee table.

FIG. 3 shows sample code for a sample Web form where repeated information is handled in accordance with an embodiment of the inventive arrangements disclosed herein.

DETAILED DESCRIPTION OF THE INVENTION

Figure 2:
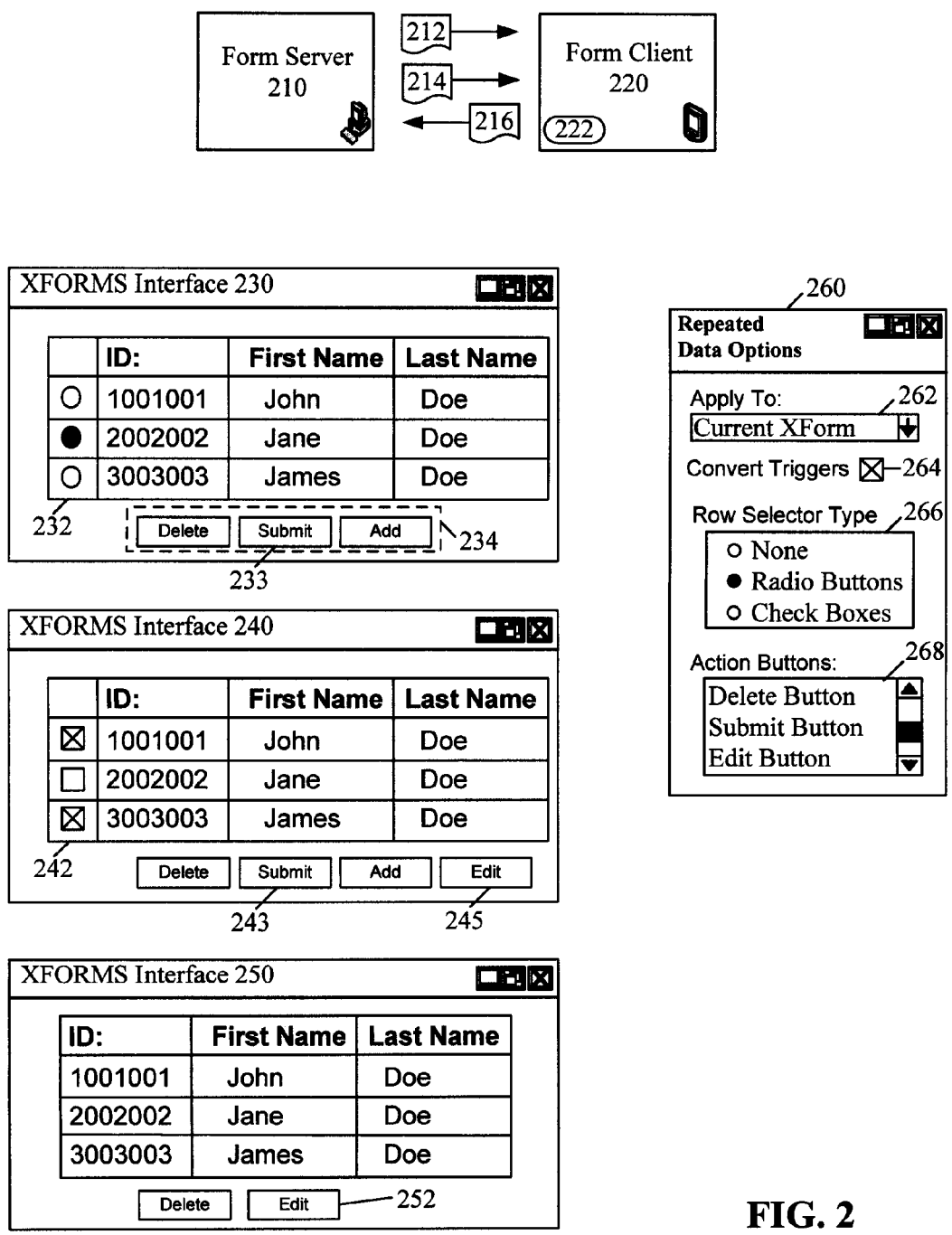
FIG. 2 is a schematic diagram of a system for handling repeated information within a form in accordance with an embodiment of the inventive arrangements disclosed herein.

FIG. 2 is a schematic diagram of a system for handling repeated information within a form in accordance with an embodiment of the inventive arrangements disclosed herein. In FIG. 2, form server 210 conveys Web forms written in a markup language to form client 220. In one embodiment, a data logic component 212 can be separated from data presentation component 214, as is the case for forms based on a Model-View-Controller approach. Form client 220 can use software engine 222 to present the form. A user of client 220 can interact via the form to produce a response 216, which is conveyed to form server 210 for processing. For example, response 216 can represent a user selection or manipulation of repeated data, which is sent to a database backend for processing.

As used herein, form server 210 can be a computer including software packages that provide Web content to client software running on form client 220. Server 210 can manage and share Web based applications and Web forms to any client connected to a network to which the server 210 is also connected. The connecting network can be any network capable of conveying information encoded within a carrier wave between server 210 and client 220. For example, the connecting network can include one or more Personal Area Networks (PANs), Local Area Networks (LAN), Metropolitan Area Networks (MAN), Wide Area Networks (WAN), and the like. The connecting network can include one or more private, public, and virtual private (VPN) networks. The connecting network can also include line based as well as wireless networks.

Form client 220 can include any computing device capable of rendering Web forms served by server 210. Client 220 can include a mobile device, such as a smart phone, personal data assistant (PDA), portable media player, handheld entertainment device, and the like, which can have limited display space due to a relatively small embedded display screen. In one embodiment, a display screen of client 220 can be a multifunction peripheral, such as a touch screen, that is capable of accepting user input. Client 220 can accept input thorough other means, such as through voice comments, handwriting input, and key presses. Client 220 is not to be limited to mobile devices, however, and other devices including desktop computers, embedded computers, and the like are contemplated herein.

The Web forms conveyed between server 210 and client 220 can adhere to any number of markup languages and standards including any language based upon a Standard Generalized Mark-up Language (SGML), which includes derivatives, subsets, and supersets of SGML. For example, in one contemplated embodiment, the Web forms utilized herein can conform to an XForms based standard. In other contemplated embodiments, the Web forms conveyed between server 210 and client 220 can conform to Webforms standards, XUL (XML User Interface Language) standards, Extensible Application Markup Language (XAML) standards, ZK User Interface Markup Language (ZUML) standards, and the like. Although for convenience, examples presented herein generally conform to an XForms standard, other standards are contemplated for which the inventive arrangements described herein can be easily applied and/or adapted.

Whichever standard the Web form of FIG. 2 conforms to, one or more tags, structures, or controls should exist within the standard to permit the repeated presentation of a collection of items, such as the XForms "repeat" element that can be used to specify a repeating structure within a form, Unlike conventional Web forms that repeat a trigger within every repeated line, such as the submit button 155 of interface 150, software engine 222 is able to present selection controls that are linked to collection level actuators or function buttons. For instance, interface 230 includes selectors 232 and delete, submit, and add actuators within a collection control section 234 of the interface 230. When an actuator from section 234 is selected, each data item chosen using selector 232 is processed in accordance with a function related to the selected actuator.

The software engine 222 can include a Web browser, a browser plug-in, and/or other software application configured to render Web form content. Additionally, the software engine 222 can optionally transcode, transform, or adapt a repeated portion of a Web form to replace a repeated trigger (such as a button) with section controls and a trigger linked to the collection. For example, software engine 222 can automatically convert XForms code 110 so that the submit button 155 is automatically replaced by radio controls 232 or binary selection controls 242, which are linked to submit button 233 or 243. Although software engine 222 is shown as residing within form client 220, a portion of the engine 222, such as a transcoding portion, can reside within server 210 or any network element or computer linked to form client 220.

A configuration interface 260 can be used to select a desired behavior of a repeated data control. Interface 260 can allow for a selection 262 of form types for which configuration settings are to be applied. A conversion option 264 can be used to specify whether line-by-line triggers are to be automatically converted into a combination of selectors and collection level actuators, A selector type section 266 can determine what type of selector is to be placed before each row of a repeated collection. Trigger section 268 can determine which buttons or actuators are to be presented within the collection control section 234 of an associated interface.

It should be noted that configuration interface 260 can be used at design time when creating code for a Web form that is ultimately conveyed to form client 220. In such an instance, markup, applet code, plug-in modules, and the like, needed to properly render interfaces 230, 240, and 250 can be conveyed to or installed within the client 220. For example, form client 220 can include an XForms plug-in module installed within software engine 222 that includes an enhanced capability for handling repeated data.

In another embodiment, the configuration interface 260 can be a user configurable interface of client 220 that can be used at run-time. Settings in interface 260 can establish default settings for selectors and actuators. Interface 260 settings can also determine options for repeated information when conventionally implemented Web forms are transcoded by software engine 222.

Interfaces 230, 240, and 250 show how client 220 can present repeated data using radio controls 232, binary selection controls 242, and hidden selectors (interface 250). Each interface 230, 240, and 250 can include a number of collection level actuators or buttons that perform functions against selected data items.

For example, selecting the delete button in interface 230 can delete data items selected using selector 232, which as shown includes a record for Jane Doe. In another example, selecting the submit button 243 can result in selected records for John and James Doe to be submitted to form server 210 for processing.

In one embodiment, the data items in the employee table can include one or more editable fields. Accordingly, a user of interface 250 can edit entries for John, Jane, and James Doe. These edits, once made, can be submitted to server 210 for processing.

In a different embodiment, fields within the employee table shown in interface 240 can contain entries that are not able to be directly edited, such as entries generated by output elements of an XForms based language. Clicking on edit button 245 can result in a popup window (not shown) being presented in which selected records can be edited. For example, a new, editable form containing records for John and James Doe can be presented, where the editable fields of the records are each associated with an input element of an XForms based language.

It should be appreciated that interfaces 230, 240, 250, and 260 are provided to demonstrate concepts described for an embodiment of the inventive arrangements disclosed herein. Interfaces 230, 240, 250, and 260 are not intended to constrain the scope of the invention to a particular contemplated expression. Derivatives of interfaces 230, 240, 250, and 260 including different interface elements, arrangements, layouts, and the like are contemplated herein.

FIG. 3 shows sample code for Web form content, such as a Web form content served by server 210 to client 220. The Web form shown in the example is an XForms based Web form that separates data content from data presentation. It should be appreciated that the sample code is presented for illustrative purposes and that the invention is not to be construed as limited to specific details presented herein.

Code 310 represents a data file saved as "employee.xml." Code 310 can be an example of component 212 that is sent to client 220. The data file of code 310 defines an employee by an identifier, a first name, and a last name. Data content in code 310 defines a first data item where: ID=1001001, FirsitName=John, and LastName=Doe. A second data item is defined where: ID=2002002, FirstName=Jane, and LastName=Doe. A third data item is defined where: ID=3003003, FirstName=James, and lastName=Doe. These data items are presented in a tabular form in interfaces 230, 240, and 250.

Code 320 represents a presentation file saved as EmployeeForm.xhtml. Code 320 can be an example of component 214 that is sent to client 220. Section 322 of code 320 binds the presentation file to the data file. Section 322 is a repeating structure that outputs tabular headings of ID, First Name, and Last Name. Section 322 also references the Employee nodeset in order to output data content contained in the data file. Code 320 can be used to generate content shown in interfaces 230, 240 and/or 250.

It should be appreciated that since the selectors appearing next to data element in interfaces 230, 240 and 250 are not defined within code 320, an externally specified collection level parameter can define display parameters for the selector and/or for the actuators shown in the interfaces 230, 240 and 250. External collection level parameters can, for example, specify a radio selector type as well as delete, submit, and add actuators, thereby resulting in interface 230. When a binary selector type is specified along with collection actuators for delete, submit, add, and edit, interface 240 can result. Similarly, when selectors are hidden and actuators of delete and edit are specified, interface 250 can result.

In one embodiment, collection level parameters can be specified by a user via interface 260. In another embodiment, a developer can use an interface (such as interface 260) to define collection level parameters. These parameters can be conveyed to client 220 in a variety of fashions, including within a separate configuration file or as specified parameters of components 212 or 214.

Code 330 represents a presentation file saved as EmployeeForm2.xhtml. Code 330 can represent a derivative of code 320, where collection level parameters are specified within presentation markup using special markup tags. Specifically, code 330 uses a special tag 332 of RepeatTable to specify a selector type of "Radio" and a collection actuator of "Submit." In code 330, a repeating structure is nested within the RepeatTable structure, which defines collection level parameters for the repeating structure. A software engine 222 of a client 220 that interprets code 330 can be configured to recognize the RepeatTable tag.

Figure 4:
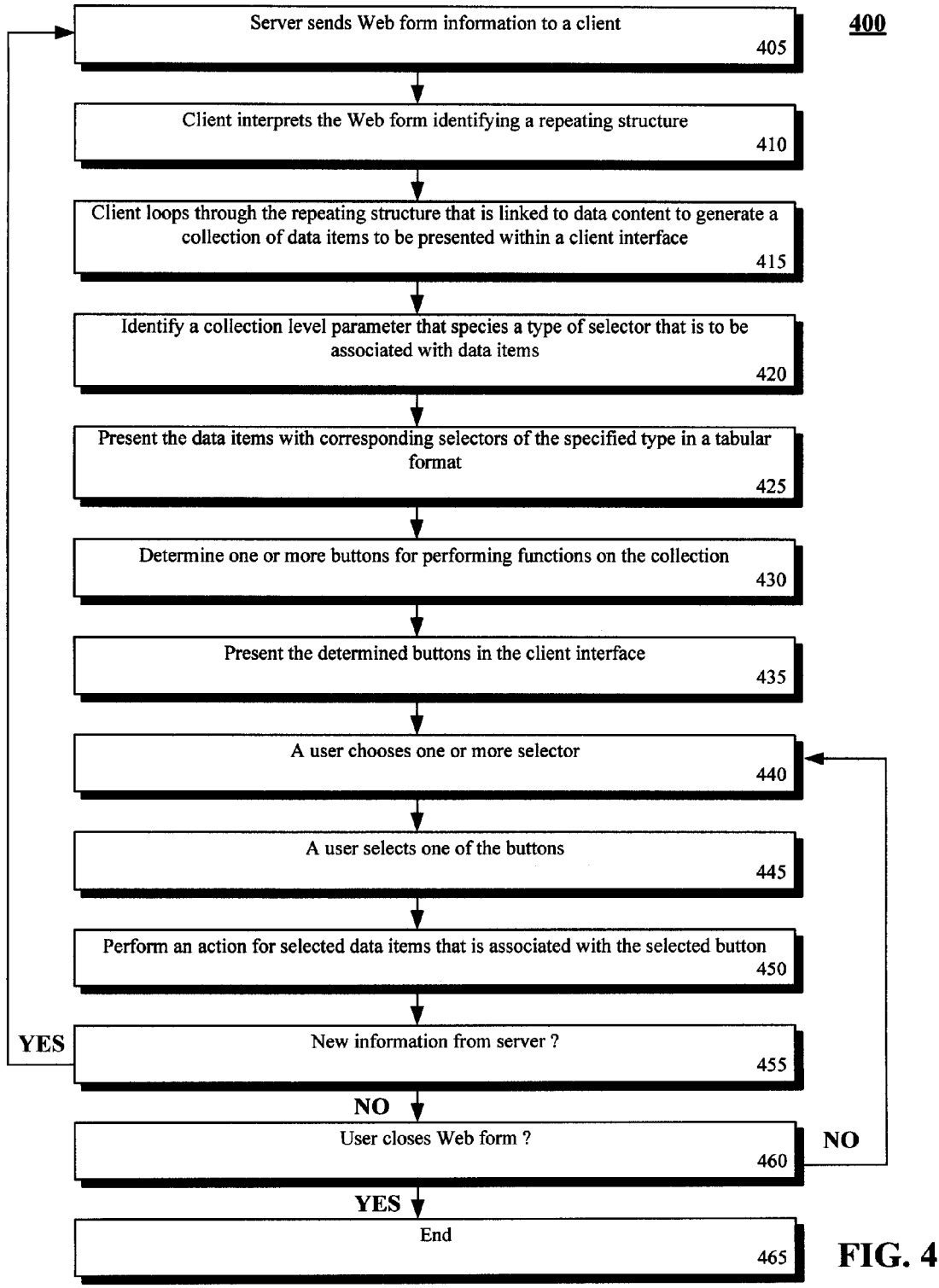
FIG. 4 is a flow chart of a method for handling repeated information in a Web form in accordance with an embodiment of the inventive arrangements disclosed herein.

FIG. 4 is a flow chart of a method 400 for handling repeated information in a Web form in accordance with an embodiment of the inventive arrangements disclosed herein. Method 400 can be performed in the context of system 200 or similar system.

Method 400 can begin in step 405 where a server can send a Web form to a client. The Web form can adhere to a variety of standards, including an XForms standard, a Webforms standard, an XAML standard and the like. In step 410, the client can interpret the Web form and identify a repeating structure. In step 415, the client can loop through the repeating structure that is linked to a data content source. This looping can generate a collection of data items that are to be presented in a client interface. In step 420, one or more collection level parameters that specify a type of collection selector can be identified. In step 425, the data items can be presented with corresponding selectors of the specified type in a tabular format.

In step 430, one or more buttons for performing functions against the collection can be determined. These buttons can include, for example, an add button, a delete button, a submit button, and an edit button. In step 435, the buttons can be presented in the client interface. In step 440, a user can choose one or more selector, thereby selecting corresponding data items. In step 445, a user can select one of the buttons. For example, if a user wants to delete a selected item, he/she can select a delete button. If the user wants to submit one or more selected items to a backend system for processing, he/she can select a submit button.

In step 450, an appropriate action for the selected button can be performed against the selected data items. In step 455, a determination can be made as to whether new information is available from the server. For example, a submit action can send information to the server, which causes the server to update the Web form. If new server information is available, the method can loop to step 405, where the server can send Web form information to the client. Otherwise, the method can proceed to step 460, where a user may close the Web form. If the user closes the Web form, the method can end in step 465. If the user does not close the Web form, the method can progress from step 460 to step 440, where a user can continue to interact with the Web form, such as by choosing one or more of the selectors as before.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A presentation interface for rendering Web form content on a client, comprising:

a Web form rendered in a browser that executes upon a computing device, wherein XForms code of the Web form processed by the browser is written in a markup language conforming to an XForms based standard, wherein said code is based upon a Model-View-Controller approach where content for the data items is separated from presentation details for presenting the data items within the interface, said XForms code comprising an XForms repeat element, which is bound to a nodeset of an associated XForms model, said nodeset comprising a collection of data items, said XForms repeat element comprising an initial markup tag that begins the XForms repeat element, a terminal markup tag that ends the XForms repeat element, and at least one output element between the initial markup tag and the terminal tag, each output element outputting a specified data item of a member of the collection, wherein the XForms repeat element causes a repetitive loop to be performed for each member of the collection, wherein code of the XForms code between the initial markup taQ of the XForms repeat element and the terminal markup taQ of the XForms repeat element lacks code for creatinQ the selectors arwearinci in the table of the Web form;

a table of the Web form rendered from the output elements of the XForms repeat element for presenting the data items in tabular format, wherein one row of the table interface element corresponds to one member of the collection, each row comprising a selector that corresponds to the associated row and member, each selector being a user interface control having an active and an inactive state; and at least one button presented in the Web form, a selection of each button causing the computing device to perform at least one function, where input parameters of the performed function comprise data items of the collection presented in the table on a row having a selector in an active state.

2. The interface of claim 1, wherein one of the at least one buttons is a submit button that submits the data items presented in the table within a row with a selector in an active state to a remotely located backend server for processing.

3. The interface of claim 2, wherein the at least button comprises a plurality of buttons, said buttons comprising an add button for adding at least one new item to the collection of data items and a delete button for removing at least one data item presented in the table within a row with a selector in an active state from the collection of data items.

4. The interface of claim 2, wherein the at least one button comprises a plurality of buttons, said buttons comprising an edit button for editing at least one of the data items presented in the table within a row with a selector in an active state that is otherwise not able to be edited.

5. The interface of claim 1, wherein the selectors are a mutually exclusive selection controls permitting one data item of the collection presented in a row of the table to be selected.

6. The interface of claim 1, wherein the selectors are non-exclusive selection controls permitting a plurality of data items of the collection presented in a row of the table to be concurrently selected.

7. The interface of claim 1, wherein said XForm code comprises a special markup tag to specify a selector type of the selectors, wherein the special markup tag is a tag for the XForms repeat element.

8. The interface of claim 7, wherein the XForm code comprises a special markup tag to specify which buttons are to appear in the Web form for the table, wherein the special markup tag is a tag for the XForms repeat element.

9. The interface of claim 1, further comprising:
a configuration interface for the Web form permitting a user of the Web form to specify a type of selector used for the selectors of the table, which are generated at runtime, wherein the type of selector specified by the configuration interface overrides any contrary instructions of the XForms code.

10. The interface of claim 1, further comprising:
a configuration interface for the Web form permitting a user of the Web form to specify said at least one button is to be presented in the Web, wherein the button specified by the configuration interface overrides any contrary instructions of the XForms code.

11. The interface of claim 1, wherein the XForms repeat element is an XForms specific element of an XForms based standard defined in the XForms based standard as part of the XForms language.

12. The interface of claim 1, wherein the interface is an interface of a mobile device.

13. A method for presenting repeated data items within a form comprising:
identifying a Web form for a browser that executes upon a computing device, wherein XForms code of the Web form processed by the browser is written in a markup language conforming to an XForms based standard, wherein said code is based upon a Model-View-Controller approach where content for the data items is separated from presentation details for presenting the data items within the interface, said XForms code comprising an XForms repeat element, which is bound to a nodeset of an associated XForms model, said nodeset comprising a collection of data items, said XForms repeat element comprising an initial markup tag that begins the XForms repeat element, a terminal markup tag that ends the XForms repeat element, and at least one output element between the initial markup tag and the terminal tag, each output element outputting a specified data item of a member of the collection, wherein the XForms repeat element causes a repetitive loop to be performed for each member of the collection, wherein code of the XForms code between the initial markup tag of the XForms repeat element and the terminal markup tag of the XForms repeat element lacks code for creating the selectors appearing in the table of the Web form;
the computing device executing the XForm code accessing instructions associated with the XForms repeat element at the element level to determine a type of selector associated with the XForms repeat element;
the computing device executing the XForm code repetitively looping through the XForms repeating element once for each member of the collection; and
the computing device presenting the Web form in a graphical interface, where the presented Web form comprises a table of the Web form rendered from the output elements of the XForms repeat element, wherein one row of the table interface element corresponds to one member of the collection, each row comprising a selector that corresponds to the associated row and member, each selector being a user interface control having an active and an inactive state, and
the computing device displaying at least one button in the Web form, a selection of each button causing the computing device to perform at least one function, where input parameters of the performed function comprise data items of the collection presented in the table on a row having a selector in an active state.

14. The method of claim 13, wherein said computing device is a mobile device, wherein the presenting and displaying steps occur using an embedded display screen of the mobile device.

15. A mobile device comprising:
a display screen embedded within a mobile device;
an input mechanism for selecting elements presented upon the embedded display screen; and
an interface for rendering Web forms upon the embedded display screen, wherein the input mechanism permits a user to interact with the rendered Web forms, said interface comprising:
a Web form rendered in a browser that executes upon a computing device, wherein XForms code of the Web form processed by the browser is written in a markup language conforming to an XForms based standard, wherein said code is based upon a Model-View-Controller approach where content for the data items is separated from presentation details for presenting the data items within the interface, said XForms code comprising an XForms repeat element, which is bound to a nodeset of an associated XForms model, said nodeset comprising a collection of data items, said XForms repeat element comprising an initial markup tag that begins the XForms repeat element, a terminal markup tag that ends the XForms repeat element, and at least one output element between the initial markup tag and the terminal tag, each output element outputting a specified data item of a member of the collection, wherein the XForms repeat element causes a repetitive loop to be performed for each member of the collection, wherein code of the XForms code between the initial markup tag of the XForms repeat element and the terminal markup tag of the XForms repeat element lacks code for creating the selectors appearing in the table of the Web form;
a table of the Web form rendered from the output elements of the XForms repeat element for presenting the data items in tabular format, wherein one row of the table interface element corresponds to one member of the collection, each row comprising a selector that corresponds to the associated row and member, each selector being a user interface control having an active and an inactive state; and
at least one button presented in the Web form, a selection of each button causing the computing device to perform at least one function, where input parameters of the performed function comprise data items of the collection presented in the table on a row having a selector in an active state.

* * * * *